United States Patent [19]
Janny et al.

[11] Patent Number: 6,106,756
[45] Date of Patent: Aug. 22, 2000

[54] PREPARATION OF HIGH SOLIDS POLY (VINYL ALCOHOL)/WATER SOLUTIONS IN A SINGLE SCREW EXTRUDER

[75] Inventors: Stephen Dennis Janny, Nazareth, Pa.; Brian Thomas Carvill, Houston, Tex.; Timothy Wayne Womer, Edinburg, Pa.

[73] Assignee: Air Products and Chemicals, Inc., Allentown, Pa.

[21] Appl. No.: 09/318,971

[22] Filed: May 26, 1999

[51] Int. Cl.$^7$ .............................. B29C 47/38; B29C 47/60
[52] U.S. Cl. ................. 264/211.21; 264/211.23; 366/79; 366/97; 366/98; 366/318
[58] Field of Search .............................. 264/185, 211.21, 264/211.22, 211.23, 349; 366/79, 97, 98, 318

[56] References Cited

U.S. PATENT DOCUMENTS

| | | |
|---|---|---|
| 4,752,136 | 6/1988 | Colby . |
| 5,318,357 | 6/1994 | Colby et al. . |
| 5,798,077 | 8/1998 | Womer et al. . |
| 5,816,698 | 10/1998 | Durina et al. . |

FOREIGN PATENT DOCUMENTS 1033395   6/1966   United Kingdom .

OTHER PUBLICATIONS

Translation of Japan 55–46303 (Nov. 22, 1980).
Translation of Japan 60–1333 (Jan. 14, 1985).
Abstract of NL8500428 (Apr. 16, 1986).

*Primary Examiner*—Leo B. Tentoni
*Attorney, Agent, or Firm*—Mary E. Bongiorno

[57] ABSTRACT

A method for producing a high solids aqueous solution of poly(vinyl alcohol) in which substantially dry poly(vinyl alcohol) is first fed into a specially designed single screw extruder. Heated water is introduced through a separate entry port downstream of the feed end of the extruder. A temperature of 38 to 121° C. and a back pressure of at least 20,786 kPa are applied to the extruder. The mixture of poly(vinyl alcohol) and water is conveyed through transition and metering sections of the single screw extruder to dispersive and distributive mixing sections to produce a high solids poly(vinyl alcohol) solution which is substantially free of gels. The high solids poly(vinyl alcohol) solution can be used directly in the production of products such as fibers and sheets.

10 Claims, 1 Drawing Sheet

PREPARATION OF HIGH SOLIDS POLY (VINYL ALCOHOL)/WATER SOLUTIONS IN A SINGLE SCREW EXTRUDER

BACKGROUND OF THE INVENTION

Poly(vinyl alcohol) is a semi-crystalline, water soluble polymer that is used in many applications, such as textiles sizing, paper coating and adhesives manufacturing. Poly (vinyl alcohol) can also be manufactured as fibers, and the fibers can be produced with a wide range of properties. By using poly(vinyl alcohol) with a high degree of hydrolysis and crystallinity, very strong fibers that are water resistant can be produced. On the other hand, by slightly lowering the degree of hydrolysis, fibers that are still hot water soluble can be produced. Although these fibers have a wide range of properties, they are difficult to manufacture. The two most common preparation techniques are the wet spinning and dry spinning processes.

In the wet spinning process, poly(vinyl alcohol) is washed with cold water and dissolved in hot water. Because of the high viscosities of these solutions, the concentration of poly(vinyl alcohol) is limited to 14–17 wt %. The solutions are then filtered, deaerated, and extruded through fine hofles of a spinnerette into a coagulation bath. The resulting fiber is subjected to drawing in a hot aqueous solution of sodium sulfate, dried, drawn in hot air, and subjected to heat treatment. Because low polymer concentrations are used in this process, all of the excess water must be flashed to produce a dry fiber. This process is very energy intensive.

In the dry spinning process, more concentrated poly(vinyl alcohol) solutions of 25 to 50 wt % can be prepared in batch or a continuous blender. This solution is extruded through a spinnerette and coagulated in a hot cell. The coagulated, dried fiber is subsequently drawn in hot air and then subjected to heat treatment.

Other methods for preparing poly(vinyl alcohol) solutions include pre-blending the poly(vinyl alcohol) and water (without dissolving) as a feed to an extruder, mixing low concentration solutions of poly(vinyl alcohol) with dry powders, and using a twin screw extruder to perform the dissolution step. Representative examples of methods used in preparing poly(vinyl alcohol) solutions are described below:

GB 1,033,395 (1966) discloses the preparation of polyvinyl alcohol solutions containing 35 to 55% polyvinyl alcohol by feeding a mixture of polyvinyl alcohol and water, containing at least 55% polyvinyl alcohol, into a continuous mixer, such as a screw extruder, having one or more intermediate entry ports in the mixer. The mixture is diluted with water or an aqueous solution of polyvinyl alcohol in which the concentration of polyvinyl alcohol is lower that that of the mixture, by introducing it through the intermediate entry ports. The final concentration of polyvinyl alcohol in the mixture is between 35 and 55%.

JP 51-146154 (1976) discloses a method of melt-extruding polyvinyl alcohol powder containing 60% or less water using a screw extruder.

JP 56-86936 (1981) discloses a method of producing a concentrated aqueous poly(vinyl alcohol) solution in which polyvinyl alcohol is poured from the input port installed at the base of a high-shear, engaging type biaxial extruder, water or an aqueous polyvinyl alcohol solution is charged from an injection port downstream from the input port, under low pressure, and hot-melt kneading is performed to form a uniform polyvinyl alcohol aqueous solution having a polyvinyl alcohol content of at least 50 wt %.

NL 8500428 (1986) (abstract; Derwent Accession Number 86-135721) discloses a continuous method for preparing homogeneous solutions of high molecular weight polymers, such as poly(vinyl alcohol) or polyacrylonitrile, by suspending the finely divided polymer in a solvent and mixing and kneading the suspension in a twin-screw, co-rotating extruder.

BRIEF SUMMARY OF THE INVENTION

This invention is directed to a method for producing a high solids aqueous solution of poly(vinyl alcohol) using a single screw extruder. The single screw extruder is designed so that the dry poly(vinyl alcohol) is uniformly fed into the feed throat of the screw, via a volumetric or preferably a gravimetric feeder, and transferred to the place in the screw where the water is injected. The pitch, i.e., helix angle, of the screw in the feed section helps to prevent the backward movement of water. Preferably, the helix angle of the screw in the feed section is 15°. After injection of the water, the screw core begins to increase in size which compresses the poly(vinyl alcohol) and water mixture. The compressed mixture is then transferred, via a metering section, to a mixing area containing a distributive mixer and at least one dispersive mixer. The extrudate is a homogeneous aqueous solution that is substantially free of gels.

A valve adapter, also known as a gate valve adapter, at the end of the extruder barrel is used to control the pressure inside the extruder barrel. A back pressure of at least 3000 psig (20,786 kPa) is applied to the extruder. Temperatures of 38 to 121° C. are applied along the length of the extruder barrel.

The extrudate can be processed, using conventional plastics processing equipment, into strands, fibers, sheets or films.

In contrast to prior art methods, such as those described in the background of the invention, the method of this invention uses a single piece of equipment for the steps of blending the water with the poly(vinyl alcohol) as well as the steps of mixing, solubilizing, and extruding the poly(vinyl alcohol) solution. Use of a single screw extruder eliminates the need to prepare solutions separately, and also reduces the amount of equipment required to produce poly(vinyl alcohol) solutions and convert them into products, such as fibers or sheets.

Some of the advantages of this method compared to known methods are:

improved control of the polymer concentration in the aqueous solutions, production of high solids poly(vinyl alcohol) aqueous solutions containing little or no gels, and production of poly(vinyl alcohol) aqueous solutions which can be used directly to produce fibers or sheets.

DETAILED DESCRIPTION OF THE INVENTION

The method can be used to prepare high solids aqueous solutions of poly(vinyl alcohol) from a variety of grades of poly(vinyl alcohol). For example, the degree of hydrolysis of the poly(vinyl alcohol) can range from 80 to 99+ mol % and the degree of polymerization (DPn) can range from about 150 to 2500. Depending on the grade of poly(vinyl alcohol) and the manufacturer, small amounts of other components can be present, such as, water, volatile organic compounds (VOC's), and sodium acetate.

Poly(vinyl alcohol) is typically supplied as ground particles. The smaller the particle size, the faster the dissolution; however, this method can be used to solubilize poly(vinyl alcohol) in a variety of particle sizes and forms.

By high solids aqueous solutions is meant poly(vinyl alcohol) containing at least about 40 wt % poly(vinyl alcohol). The amount of poly(vinyl alcohol) which can be solubilized using this method is dependent on the degree of polymerization (DPn) of the poly(vinyl alcohol). For example, the lower the DPn of the poly(vinyl alcohol), the higher the amount of poly(vinyl alcohol) which can be solubilized using the method of this invention. Aqueous solutions containing 60 wt % or more poly(vinyl alcohol) can be obtained with this method.

The length of the screw of the single screw extruder is expressed as a ratio of length to outer diameter (L/D) of the screw. A length of 30 L/D indicates that the length is 30 times the outer diameter of the screw. The total length of the single screw extruder can be from about 30 L/D to 45 L/D; preferably 32 L/D to 40 L/D.

Substantially dry poly(vinyl alcohol) is uniformly fed into the feed section of the extruder, by way of a feed throat, using a standard feeder, such as a volumetric feeder or a gravimetric feeder. A gravimetric feeder is preferred. A uniform flow of poly(vinyl alcohol) is important in order to prevent surging in the extruder.

Water is added at a separate location downstream from the point of entry of the poly(vinyl alcohol) into the feed section and prior to compression of the poly(vinyl alcohol) and water mixture. For example, the water can be fed through a port which is approximately 8 L/D from the beginning of the feed section. The water is heated to a temperature below its boiling temperature, preferably 170 to 190° F. (76.7 to 87.8° C.), before being fed into the extruder. A water temperature below the boiling point of water is desired in order to prevent the generation of steam which might travel backward toward the feed throat of the extruder. The heated water is added at a pressure above about 100 psig (791 kPa); preferably about 425 psig (3032 kPa).

The feed rate of the poly(vinyl alcohol) and the flow rate of the water is dependent on the size of the extruder and the amount of solids desired in the final solution.

Figure 1:
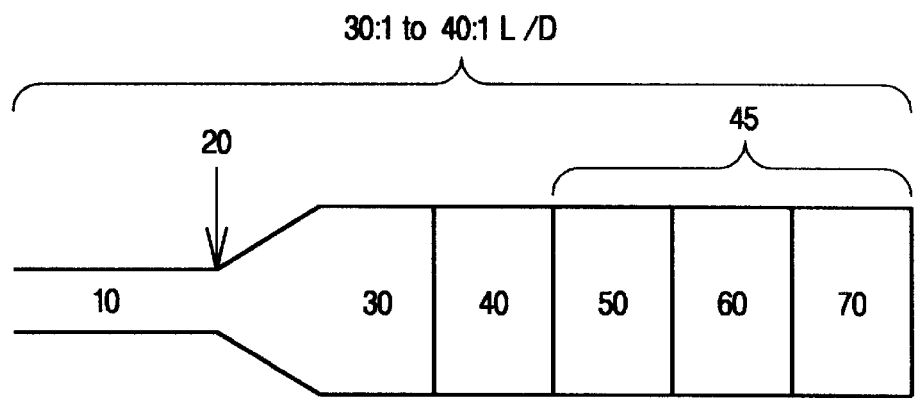
FIG. 1 is a schematic drawing of the core of a single screw extruder of this invention.
Figure 2:
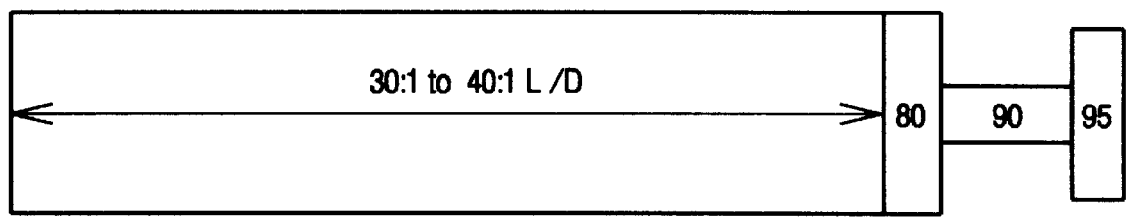
FIG. 2 is a schematic drawing of the barrel of a single screw extruder of this invention.

FIG. 1 and FIG. 2 are schematic drawings of the core (FIG. 1) and the barrel (FIG. 2) of a single screw extruder which has been found to be effective in this invention. The initial section of the screw is the feed section (10) which can be approximately 7 L/D. The feed section conveys dry poly(vinyl alcohol) to the place in the screw at which water is added; i.e., a water injection port (20). A steady flow of the dry poly(vinyl alcohol) with minimal pulsation is desired for steady operation of the extruder. The pitch of the screw facilitates the movement of the poly(vinyl alcohol) at the desired rate and prevents the solids from backing up in the feed throat. The typical helix angle in the feed section of the extruder is 17.66°; however, the preferred helix angle is 15°.

Heated water is introduced through a port (20) in the barrel of the extruder. The screw core then begins to increase in size and serves to compress the poly(vinyl alcohol)/water mixture and thus facilitate the mixing of the water with the poly(vinyl alcohol). The increase in size of the screw core results in about a 33% decrease in the channel depth (the distance between the wall of the extruder barrel and the core of the screw) and a compression ratio of about 2:1 to 4:1. The preferred compression ratio is 3:1.

The poly(vinyl alcohol) and water mixture is transferred through a transition section (30) which can be about 8 to 10 L/D to a metering section (40) which can be about 4 to 6 L/D. The metering section serves to convey and pump the poly(vinyl alcohol)/water mixture into the mixing section (45) which can be divided into sections each of which can be about 4 to 6 L/D.

The mixing section can be segmented in order to facilitate adding and/or changing the location of mixers. The mixing section preferably contains one distributive mixer (50) followed by two dispersive mixers (60 and 70). However, alternative configurations may be appropriate for obtaining uniform poly(vinyl alcohol) solutions containing little or no gels. The distributive mixer is designed to evenly distribute the poly(vinyl alcohol) and water mixture. The preferred distributive mixer is a Pulsar® II distributive mixer, a patented (U.S. Pat. No. 4,752,136 and U.S. Pat. No. 5,816,698) design of Spirex, Inc, which provides minimal pumping. The dispersive mixers are designed to create regions of high shear in which the dissolution of the poly(vinyl alcohol) can occur. The high shear mixers also serve to reduce or eliminate any small gels that have formed. The preferred dispersive mixers are a Z-mixer and a V-mixer, both of which are patented (U.S. Pat. No. 5,318,357 and U.S. Pat. No. 5798,077) designs of Spirex, Inc. Most preferably, one of each of a Z-mixer and a V-mixer are used for the dispersive mixers and the Z-mixer precedes the V-mixer in the extruder.

A high discharge pressure is desired for this process and can be accomplished by closing a throttling valve, also known as a gate valve, within a valve adapter attached at the exit end of the extruder barrel (80, FIG. 2). The high pressure enables a high degree of fill in the extruder and, therefore, better utilization of the dispersive mixers. By high pressure is meant a discharge pressure of at least 3000 psig (20,786 kPa). Pressures of at least 4500 psig (31,129 kPa) are preferred. Without being bound by theory, it is believed that the high degree of fill achieved with the high pressure helps to eliminate or prevent the formation of gels.

Temperatures of 100 to 250° F. (38 and 121° C.), preferably 190 to 220° F. (87.8 and 104.4° C.) are applied along the length of the extruder barrel.

The heat and pressure applied to the extruder are such that dissolution of the poly(vinyl alcohol) is facilitated but water does not vaporize from the poly(vinyl alcohol)/water melt. The feed throat is kept cooler to prevent water from vaporizing and moving backward into the feed throat. For example, the applied heat is about 100° F. (37.8° C.) in the feed throat where the pressure is 0 psig (101 kPa). However temperatures of about 210° F. (100° C.), preferably 230 to 240° F. (110 to 116° C.) can be applied at positions along the extruder in which the pressure is above 100 psig (791 kPa).

An aftercooler (90, FIG. 2) is preferably attached to the extruder barrel in order to cool the extrudate below the flash point of water and prevent foaming of the extrudate as it exits the extruder. A die (95, FIG. 2) can be attached to the extruder barrel for immediate production of end-products such as strands, sheets, or pellets.

The invention will be further clarified by a consideration of the following examples, which are intended to be purely exemplary of the invention.

EXAMPLE 1

Airvol®325 poly(vinyl alcohol) powder (98.0–98.8 mol % hydrolysis; 1000 to 1500 DPn; containing a maximum 5% volatiles) was fed into a two-inch single screw extruder at 33 lb/h (15 kg/h) using a ConAir feeder. FIG. 1 and FIG. 2 are schematics of the single screw extruder used in this example. The feed section (10) was 7 L/D and had a 15° helix angle. The transition section (30) was 8.8 L/D. The metering section (40) was 4 L/D. Each of the three mixers (50, 60, and 70) were 4 L/D; 50 was a Pulsar® II distributive mixer, 60 was a Z-mixer, and 70 was a V-mixer, all of which are patented designs of Spirex, Inc. The entire screw was 32:1 L/D. The compression ratio in the extruder from 12 L/D to the end of the screw was 3/1. A barrel gate valve adapter (80), after cooler (90) and die (95) were attached to the extruder.

Water was fed into the extruder at 8 L/D (20) at a rate of 25 lb/h (11.3 kg/h), a pressure of 425 psig (3032 kPa), and a temperature of 184° F. (84.4° C.). The screw speed was 50 rpm.

The table below shows the temperature applied to the extruder, the temperature of the poly(vinyl alcohol) and water mixture (melt temperature), and the pressure at various positions in the extruder.

| Position in Extruder | Temperature Applied to Extruder (° F.) | Temperature of Melt (° F.) | Pressure (psig) |
|---|---|---|---|
| 4 L/D | 100 | 182 | 0 |
| 12 L/D | 209 | 206 | 31 |
| 16 L/D | 210 | 218 | 417 |
| 20 L/D | 220 | 222 | 1,965 |
| 24 L/D | 220 | 233 | 132 |
| 30 L/D | 190 | 239 | 4,485 |
| Barrel Adapter | 193 | 243 | |
| After Cooler | 156 | 211 | |
| Die | 195 | | |

It was calculated that the wt % of poly(vinyl alcohol) in the extrudate would be about 56.9 wt %; however the measured amount of solids was 62.9 wt %. It is believed that the difference in the measured and calculated amount of solids is due to vaporization of water when the melt exited the extruder. There was a very low gel content in the extrudate.

EXAMPLE 2

Airvol®325 poly(vinyl alcohol) was fed into a two-inch single screw extruder at 37 lb/h (16.8 kg/h). The same configuration of extruder was used as in Example 1. Water was fed into the extruder at a rate of 27 lb/h (12.2 kg/h), a pressure of 425 psig (3032 kPa), and a temperature of 181° F. (82.8° C.). The screw speed was 50 rpm.

The table below shows the temperature applied to the extruder, the temperature of the poly(vinyl alcohol) and water mixture (melt temperature), and the pressure at various positions in the extruder.

| Position in Extruder | Temperature Applied to Extruder (° F.) | Temperature of Melt (° F.) | Pressure (psig) |
|---|---|---|---|
| 4 L/D | 100 | 180 | 6 |
| 12 L/D | 210 | 205 | 2 |
| 16 L/D | 210 | 228 | 739 |
| 20 L/D | 230 | 234 | 1,567 |
| 24 L/D | 230 | 238 | 59 |
| 30 L/D | 190 | 230 | 4,485 |
| Barrel Adapter | 191 | 221 | |
| After Cooler | 100 | 203 | |

The extrudate contained 59.7 wt % poly(vinyl alcohol) and had a very low gel content.

EXAMPLE 3

Airvol®325 poly(vinyl alcohol) was fed into a two-inch single screw extruder at 37 lb/h (16.8 kg/h). The following changes were made in the configuration of the extruder as presented in Example 1. In the mixing section, 50 and 70 were Pulsar® II distributive mixers and 60 was a fight zone. Water was fed into the extruder at a rate of 29 lb/h (13.2 kg/h), a pressure of 425 psig, and a temperature of 184° F. The screw speed was 46 rpm.

The table below shows data collected on the temperature applied to the extruder, the temperature of the extrudate, and the pressure at various positions in the extruder.

| Position in Extruder | Temperature Applied to Extruder (° F.) | Temperature of Melt (° F.) | Pressure (psig) |
|---|---|---|---|
| 4 L/D | none | | 3 |
| 12 L/D | 190 | | 10 |
| 16 L/D | 190 | | 240 |
| 20 L/D | 180 | | 310 |
| 24 L/D | 180 | | 24 |
| 30 L/D | 193 | | 36 |
| Barrel Adapter | 174 | | |
| After Cooler | | 188 | |

The extrudate contained a high amount of undissolved poly(vinyl alcohol).

What is claimed is:

1. A method for producing a high solids aqueous solution of poly(vinyl alcohol) containing little or no gels which comprises using a single screw extruder having, in sequence, a feed section, a transition section, a metering section, and a mixing section, wherein a temperature of 38 to 121° C. and a back pressure of at least 20,786 kPa are applied to the extruder, and comprises the steps of:

feeding a substantially dry poly(vinyl alcohol) into a first end of the feed section of said single screw extruder;

pressure feeding heated water to the dry poly(vinyl alcohol) at an injection port downstream of the first end of the feed section, to form a combined poly(vinyl alcohol) and water stream;

compressing the combined poly(vinyl alcohol) and water stream in the transition section of said single screw extruder to form a compressed poly(vinyl alcohol)/water stream;

conveying the compressed poly(vinyl alcohol)/water stream through the transition section of said single screw extruder to the metering section;

conveying the compressed poly(vinyl alcohol)/water stream through the metering section of said single screw extruder to the mixing section; and conveying the compressed poly(vinyl alcohol)/water stream through the mixing section of said single screw extruder wherein the mixing section comprises a distributive mixer followed by at least one high shear dispersive mixer;

to form the high solids aqueous poly(vinyl alcohol) solution containing little or no gels.

2. The method of claim 1 wherein a compression ratio of about 2:1 to 4:1 is obtained at the transition section.

3. The method of claim 2 wherein the screw has a helix angle of approximately 15° in the feed section and the compression ratio in the transition section is 3:1.

4. The method of claim 3 wherein said single screw extruder has an overall length of approximately 30 to 45 times the diameter of the screw.

5. The method of claim 3 wherein said single screw extruder has an overall length of approximately 32 to 40 times the diameter of the screw.

6. The method of claim 5 wherein the mixing section comprises a distributive mixer followed by two dispersive mixers.

7. The method of claim 6 wherein the temperature applied to said single screw extruder is 87 to 104° C., and the applied back pressure is at least 31,129 kPa.

8. The method of claim 7 wherein the heated water has a temperature of 76 to 88° C.

9. A method for producing a high solids aqueous solution of poly(vinyl alcohol) containing little or no gels which comprises using a single screw extruder having, in sequence, a feed section, a transition section, a metering section, and a mixing section, wherein a temperature of 38 to 121° C. and a back pressure of at least 20,786 kPa are applied to the extruder, and comprises the steps of:

feeding a substantially dry poly(vinyl alcohol) into a first end of the feed section of said single screw extruder wherein the feed section has a helix angle of 15° C.;

pressure feeding heated water to the dry poly(vinyl alcohol) at an injection port downstream of the first end of the feed section, to form a combined poly(vinyl alcohol) and water stream;

compressing the combined poly(vinyl alcohol) and water stream in the transition section of said single screw extruder to form a compressed poly(vinyl alcohol)/water stream wherein the transition section has a compression ratio of 3:1;

conveying the compressed poly(vinyl alcohol)/water stream through the transition section of said single screw extruder to the metering section;

conveying the compressed poly(vinyl alcohol)/water stream through the metering section of said single screw extruder to the mixing section; and conveying the compressed poly(vinyl alcohol)/water stream through the mixing section of said single screw extruder wherein the mixing section comprises a distributive mixer followed by at least one high shear dispersive mixer;

to form the high solids aqueous poly(vinyl alcohol) solution containing little or no gels.

10. The method of claim 9 wherein the high solids aqueous poly(vinyl alcohol) solution contains at least 40 wt % poly(vinyl alcohol).

* * * * *